(12) United States Patent
Sheng (10) Patent No.: US 11,325,669 B1
(45) Date of Patent: May 10, 2022

(54) BICYCLE ADJUSTABLE SEATPOST

(71) Applicant: TIEN HSIN INDUSTRIES CO., LTD., Taichung (TW)

(72) Inventor: Wei-Kong Sheng, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 59 days.

(21) Appl. No.: 17/087,307

(22) Filed: Nov. 2, 2020

(51) Int. Cl.
*B62J 1/08* (2006.01)
*B62J 43/30* (2020.01)

(52) U.S. Cl.
CPC ............... *B62J 1/08* (2013.01); *B62J 43/30* (2020.02); *B62J 2001/085* (2013.01)

(58) Field of Classification Search
CPC ................................................. B62J 2001/085
See application file for complete search history.

(56) References Cited

U.S. PATENT DOCUMENTS

| 2018/0186419 A1* | 7/2018 | Shipman | B62K 19/36 |
| 2020/0307729 A1* | 10/2020 | Shirai | G05B 15/02 |
| 2021/0206443 A1* | 7/2021 | Sakagawa | B62K 19/36 |
| 2021/0403111 A1* | 12/2021 | Chambers | B62J 1/06 |
| 2022/0041234 A1* | 2/2022 | Sakagawa | G01D 5/142 |
| 2022/0041236 A1* | 2/2022 | Lin | B62J 1/08 |

FOREIGN PATENT DOCUMENTS

| CN | 111846043 A | * | 10/2020 | |
| CN | 214057766 U | * | 8/2021 | |
| DE | 102019125234 A1 | * | 3/2021 | |
| DE | 202020106467 U1 | * | 3/2021 | B62J 1/08 |
| DE | 102020112369 A1 | * | 11/2021 | |

* cited by examiner

*Primary Examiner* — Timothy J Brindley
(74) *Attorney, Agent, or Firm* — Tracy M. Helms; Apex Juris, pllc.

(57) ABSTRACT

A bicycle adjustable seatpost includes a seatpost assembly, connecting base, telescopic cylinder, and control assembly. The cylinder of telescopic cylinder is connected to outer tube of seatpost assembly. The piston rod of telescopic cylinder is connected to inner tube of seatpost assembly and divides cylinder into first and second chambers. The connecting base is connected to saddle and has a motor chamber. The control assembly includes a motor including a cam and an actuation rod. The motor is in the motor chamber; the actuation rod is in the seatpost assembly and one end thereof extends into the motor chamber; the cam abuts against the actuation rod. When the cam is driven by the motor to rotate, the actuation rod reciprocates along axis thereof to connect or block the chambers. When the chambers are connected, the seatpost assembly length and saddle height can be adjusted.

12 Claims, 12 Drawing Sheets

BICYCLE ADJUSTABLE SEATPOST

BACKGROUND OF THE INVENTION

1. Technical Field

The present disclosure relates generally to an adjustable bicycle seatpost, and more particularly to a wirelessly controlled bicycle adjustable seatpost structure.

2. Description of Related Art

In many high-end bicycles, saddles are set on seatposts that can be adjusted at any time, wherein the rider can press a switch on the handlebar to control the length of the lifting seatpost for adjusting the height of the saddle without getting off the bicycle.

Figure 1:
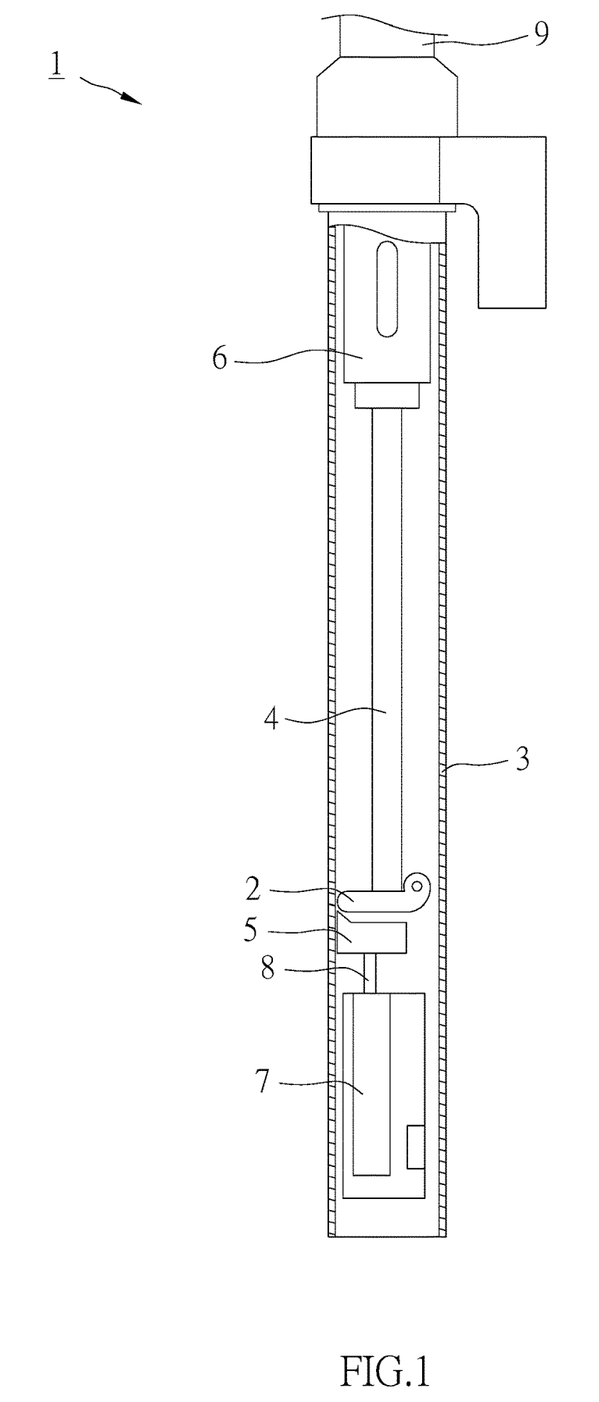
FIG. 1 is a schematic diagram of the conventional bicycle lifting seatpost.

As shown in FIG. 1, a conventional bicycle adjustable seatpost 1 includes a lever 2 pivotally connected to a seatpost 3 as a pivot, wherein the middle section of the lever 2 abuts against an end of a valve rod 4, and the end section thereof abuts against a cam block 5. Such lever structure controls the oil circuit in a valve seat 6 to be opened or closed.

During adjusting the height of the saddle, the rider presses the switch to start a motor 7, and thus a drive shaft 8 of the motor 7 drives the cam block 5 to rotate a predetermined angle, which makes the cam block 5 push the lever 2 upward. Next, the lever 2 is deflected and pushes up the valve rod 4 so that the oil circuit in the valve seat 6 is opened. In this way, riders can adjust the position of the saddle through the linear displacement of the seat post 9 relative to the seatpost 3.

When the saddle is adjusted to an appropriate height, the rider releases the switch to make the drive shaft 8 of the motor 7 drive the cam block 5 to stop pushing the lever 2. At this time, a recovery elastic (not shown) within the valve seat 6 pushes the valve rod 4 down to close the oil circuit in the valve seat 6 so as to complete the positioning of the seat post 9.

Although the lever, the valve rod, and the cam block of the prior art form a labor-saving lever structure, the moving path of the valve rod is too short, and the opened oil circuit in the valve seat is limited, so that fluid resistance in the valve seat would hinder the adjustment of the saddle. Moreover, if the oil circuit has to be larger, the size of the cam block has to be increased to lengthen the moving path of the valve rod. However, such change in design increases the volume and weight of the overall seatpost, which takes up more space. Therefore, the aforementioned problems must be solved.

BRIEF SUMMARY OF THE INVENTION

In view of the above, the primary objective of the present disclosure is to provide a bicycle adjustable seatpost which is lightweight and is easy to use.

The present disclosure provides a bicycle adjustable seatpost including a seatpost assembly, a connecting base, a telescopic cylinder, and a control assembly. The seatpost assembly includes an outer tube and an inner tube whose outer diameter is smaller than an inner diameter of the outer tube, wherein the inner tube is at least partially set in the outer tube and is movable along an axial direction of the outer tube; the outer tube is provided to be installed in a frame of a bicycle. The connecting base is provided at an end of the inner tube to be connected to a saddle of the bicycle, wherein the connecting base has a motor chamber and a battery chamber; the motor chamber communicates with the interior of the inner tube. The telescopic cylinder includes a cylinder and a piston rod, wherein the cylinder is connected to the outer tube and is filled with a fluid; the piston rod includes a rod and a piston head connected to the rod; the rod is connected to the inner tube, wherein one end of the rod extends into the cylinder and is connected to the piston head; the piston head divides the cylinder into a first chamber and a second chamber. The control assembly includes a motor, an actuation rod, a cam, a control circuit board, and a battery; the motor is provided in the motor chamber, and includes an output shaft; the actuation rod is provided in the seatpost assembly, and one end of the actuation rod extends into the motor chamber, wherein an angle between an axle center of the actuation rod and an axle center of the output shaft is between 80° and 100°; the cam is provided on the output shaft, and has a driving part in a circumferential direction thereof; the driving part abuts against the actuation rod, and drives the actuation rod reciprocate along an axis of the actuation rod between a first position and a second position; the driving part has a first part and a second part, wherein the shortest distance between the first part and the output shaft is less than the shortest distance between the second part and the output shaft; when the first part of the driving part abuts against the actuation rod, the actuation rod is in the first position so that the first chamber doesn't communicate with the second chamber; when the second part of the driving part abuts against the actuation rod, the actuation rod is in the second position so that the first chamber communicates with the second chamber; the control circuit board is electrically connected to the motor to control the output shaft to rotate; the battery is provided in the battery chamber, and is electrically connected to the control circuit board.

From the above, the motor drives the cam to rotate and thus drives the actuation rod to move along its axis, so as to block or connect the first chamber and the second chamber in the cylinder, and thus to adjust or fix the length of the seatpost assembly. In addition, the design of the angle between the axle center of the output shaft of the motor and the axle center of the actuation rod conserve the output power of the motor. Furthermore, because of the operational relationship between the cam and the actuation rod, when the second part abuts against the actuation rod, the fluid passage between the first chamber and the second chamber is appropriate, which facilitates the flow of the fluid within the chambers, so that the process of adjusting the length of the seatpost assembly is much smoother.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 2:
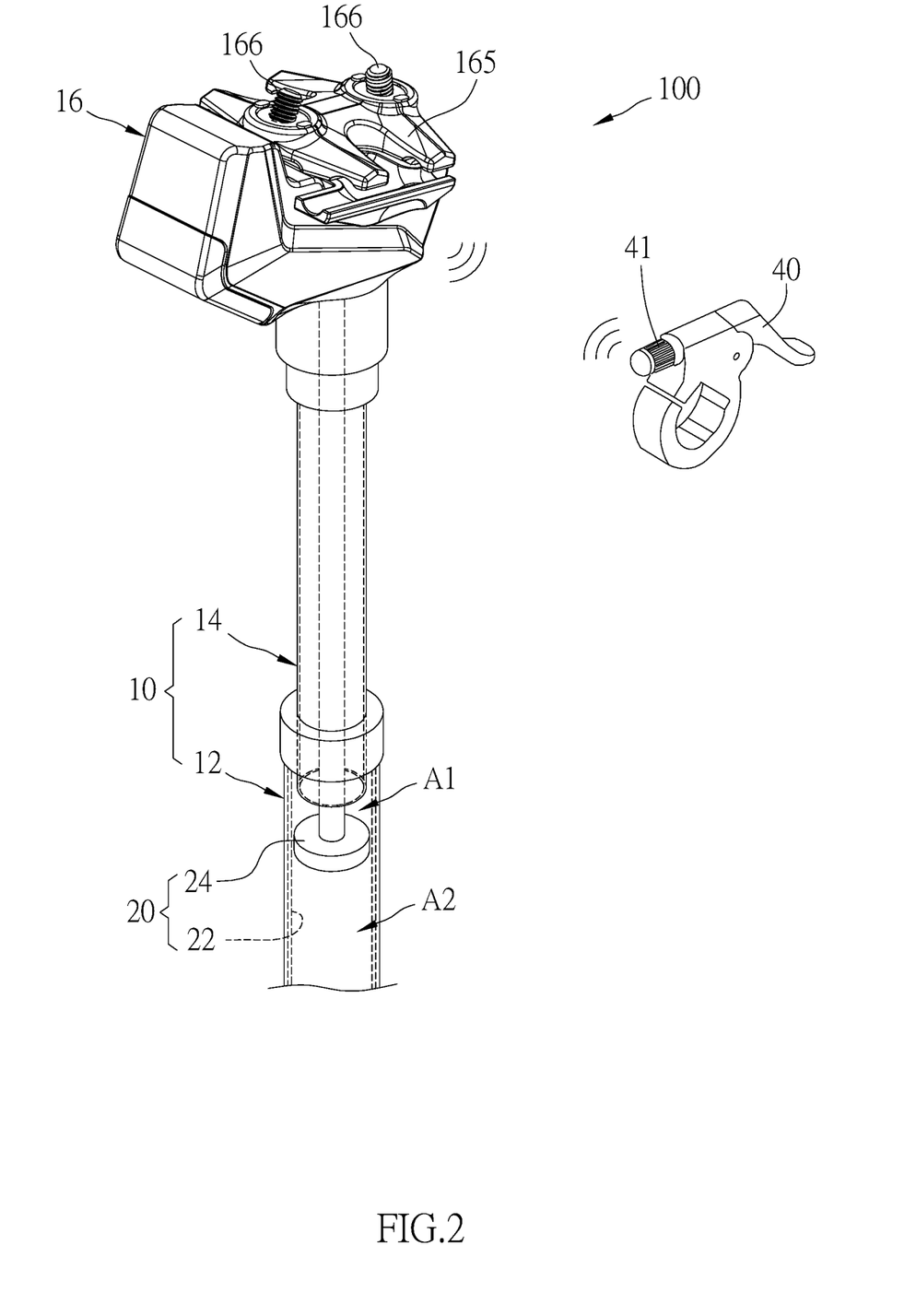
FIG. 2 is an application diagram of the bicycle adjustable seatpost of the first preferred embodiment.
Figure 3:
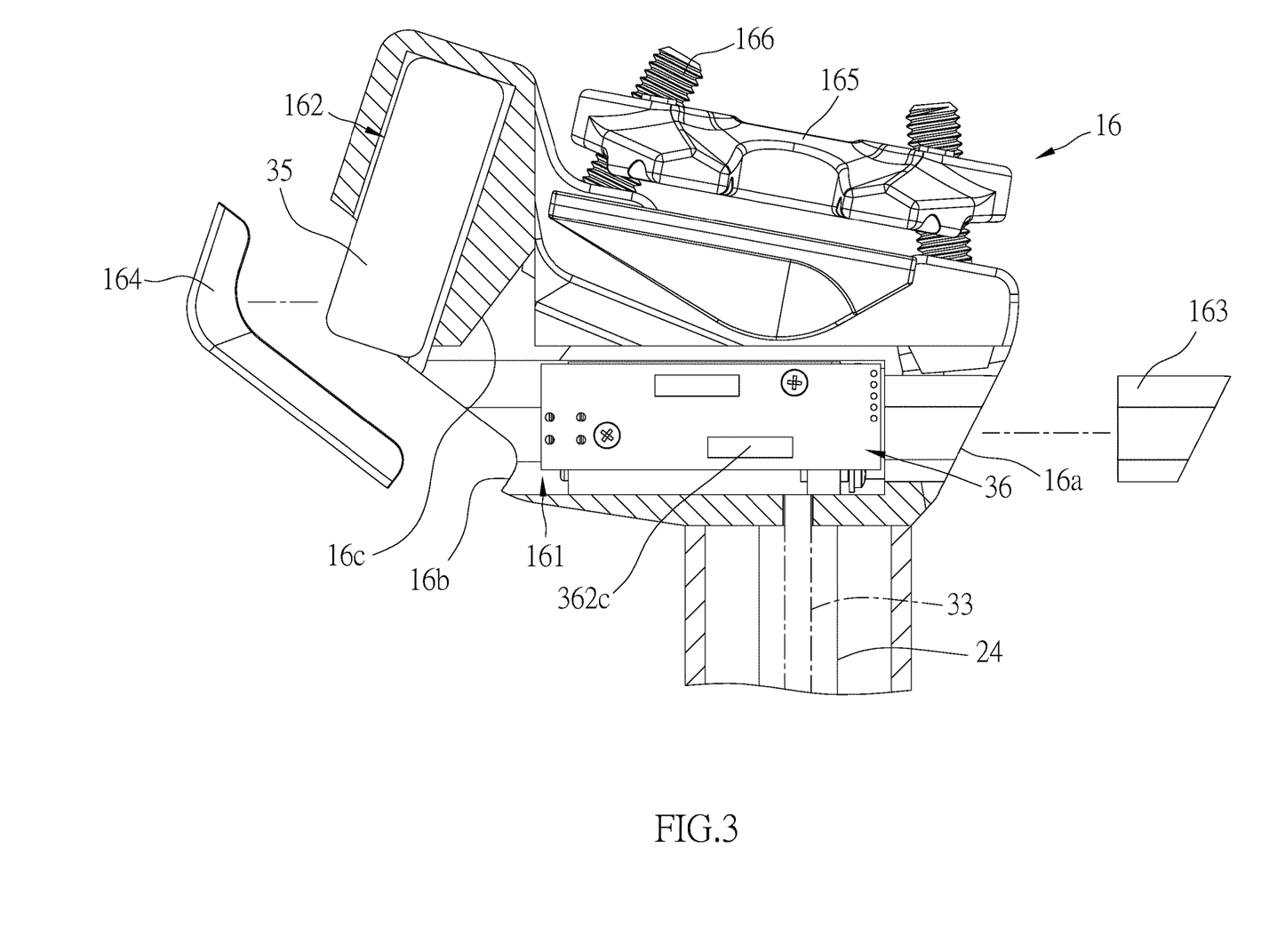
FIG. 3 is a partial sectional view of the bicycle adjustable seatpost of the first preferred embodiment.

As shown in FIG. 2 and FIG. 3, a first embodiment of the present disclosure, a bicycle adjustable seatpost 100, is provided, wherein the bicycle adjustable seatpost 100 includes a seatpost assembly 10, a telescopic cylinder 20, and a control assembly 30.

The seatpost assembly 10 includes an outer tube 12 and an inner tube 14 whose outer diameter is smaller than the inner diameter of the outer tube 12; the inner tube 14 passes through the outer tube 12 and is movable along an axial direction of the outer tube 12. The outer tube 12 is provided to be connected to a frame of a bicycle (not shown). An upper end of the inner tube 14 is located outside the outer tube 12, and is connected to a connecting base 16 which is provided for connected to a saddle (not shown).

The connecting base 16 has a motor chamber 161 and a battery chamber 162, wherein the motor chamber 161 communicates with the interior of the inner tube 14 and the battery chamber 162. The motor chamber 161 is located between the saddle and the inner tube 14, and partly overlaps with a projection area of the inner tube 14 extending toward the saddle. Furthermore, the motor chamber 161 communicates with the outside with a receiving opening 16a and an accommodating opening 16b, and the accommodating opening 16b is located at the junction of the motor chamber 161 and the battery chamber 162. The connecting base 16 further includes a first lid 163 and a second lid 164, wherein the first lid 163 is provides to cover the receiving opening 16a, and the second lid 164 is provides to cover the accommodating opening 16b. The abovementioned connecting base 16 and the inner tube 14 are integral, which is made of metal materials like the outer tube 12 to maintain the rigidity of the seatpost assembly. On the other hand, the first lid 163 and the second lid 164 are made of non-metallic materials such as plastic, silicone, or glass fiber composite.

In this embodiment, for realizing the combination of the seatpost assembly 10 and the saddle of the bicycle, the connecting base 16 has two through holes 16c, and further includes an adjusting seat 165 and two fixing members 166. The two through holes 16c communicate with the motor chamber 161; one of the through holes 16c is corresponding to the receiving opening 16a, and the other is corresponding to the accommodating opening 16b. Each of the fixing members 166 passes through one of the through holes 16c and the adjusting seat 165 in order, and is fixed to the saddle. By such design, the saddle can be adjusted according to personal needs to increase the flexibility of use. Moreover, the number of the through holes and the fixing members are not limited to the abovementioned number.

The telescopic cylinder 20 includes a cylinder 22 and a piston rod 24. The cylinder 22 is fixedly installed in the outer tube 12, and is filled with a fluid (not shown) which can be gas or liquid. The piston rod 24 has a rod 242 and a piston head 244 connected to the rod 242. The rod 242 is fixedly located in the inner tube 14; one end of the rod 242 extends into the cylinder 22, and is connected to the piston head 244. Furthermore, the piston head 244 divides the cylinder 22 into a first chamber A1 and a second chamber A2. Whether the first chamber A1 communicates with the second chamber A2 will affect the movement of the piston rod 24 relative to the cylinder 22, and then affect the movement of the inner tube 14 relative to the outer tube 12.

The control assembly 30 is provided to connect or block the first chamber A1 and the second chamber A2. As shown in FIG. 4 to FIG. 8, the control assembly 30 includes a motor housing 31, a motor 32, an actuation rod 33, a cam 34, a battery 35, and a control circuit board 36. The motor housing 31 is installed in the motor chamber 161 through the accommodating opening 16b, and has a first opening 31a and a second opening 31b, which are opposite to each other. The motor 32 is put in the motor housing 31 through the first opening 31a, and an output shaft 321 of the motor 32 passes through the second opening 31b.

Figure 7:
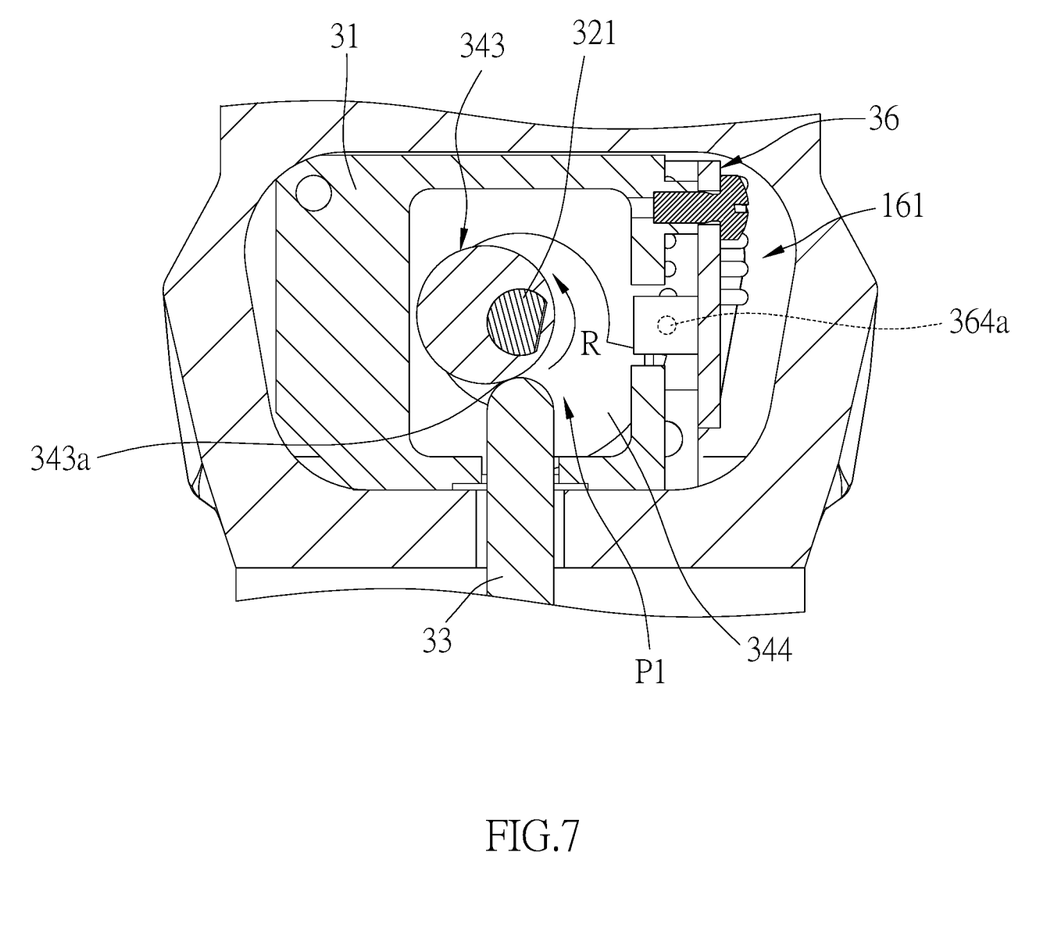
FIG. 7 is a partial sectional view along the 7-7 line in FIG. 6.
Figure 8:
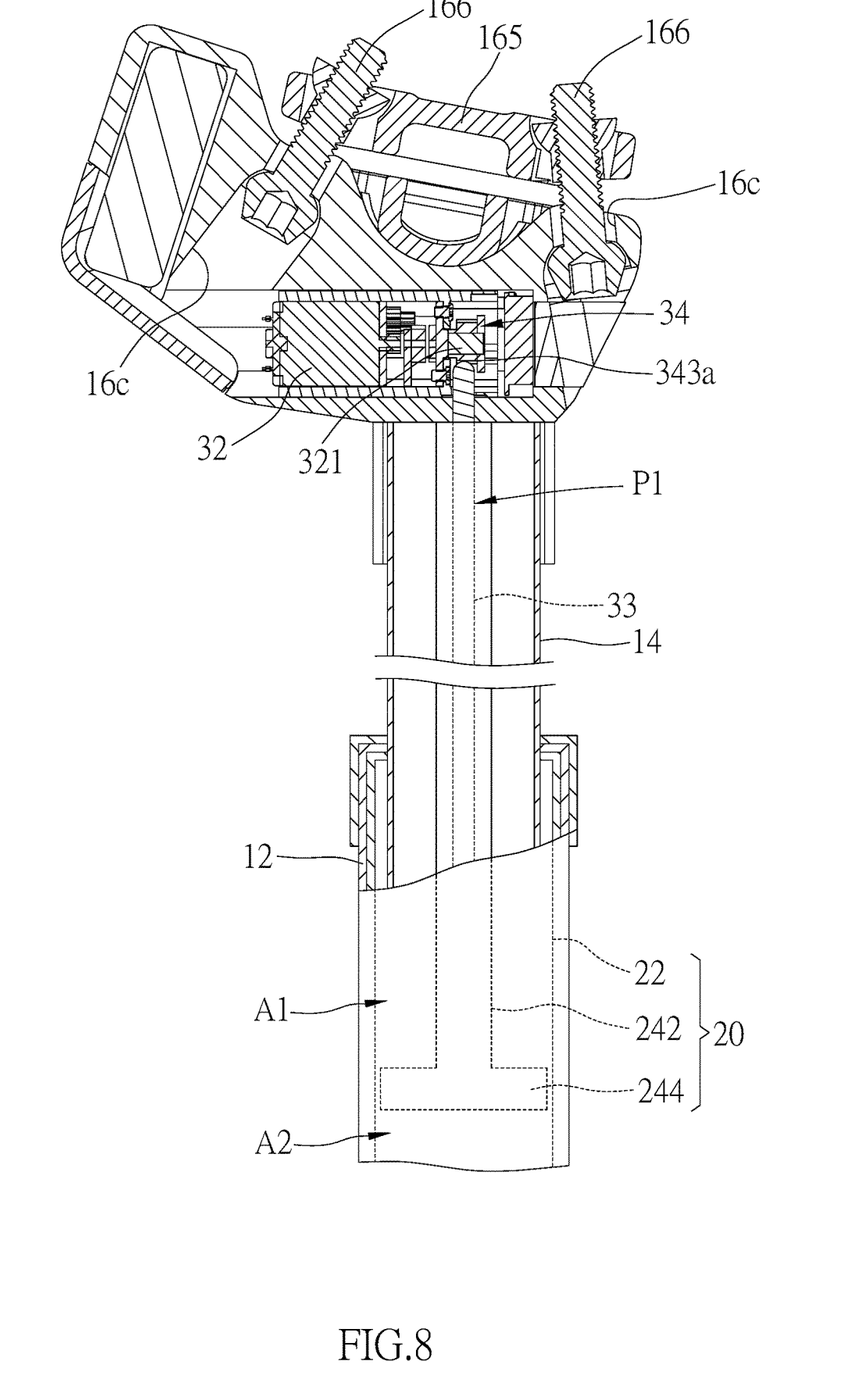
FIG. 8 is a sectional view along the 8-8 line in FIG. 6.
Figure 9:
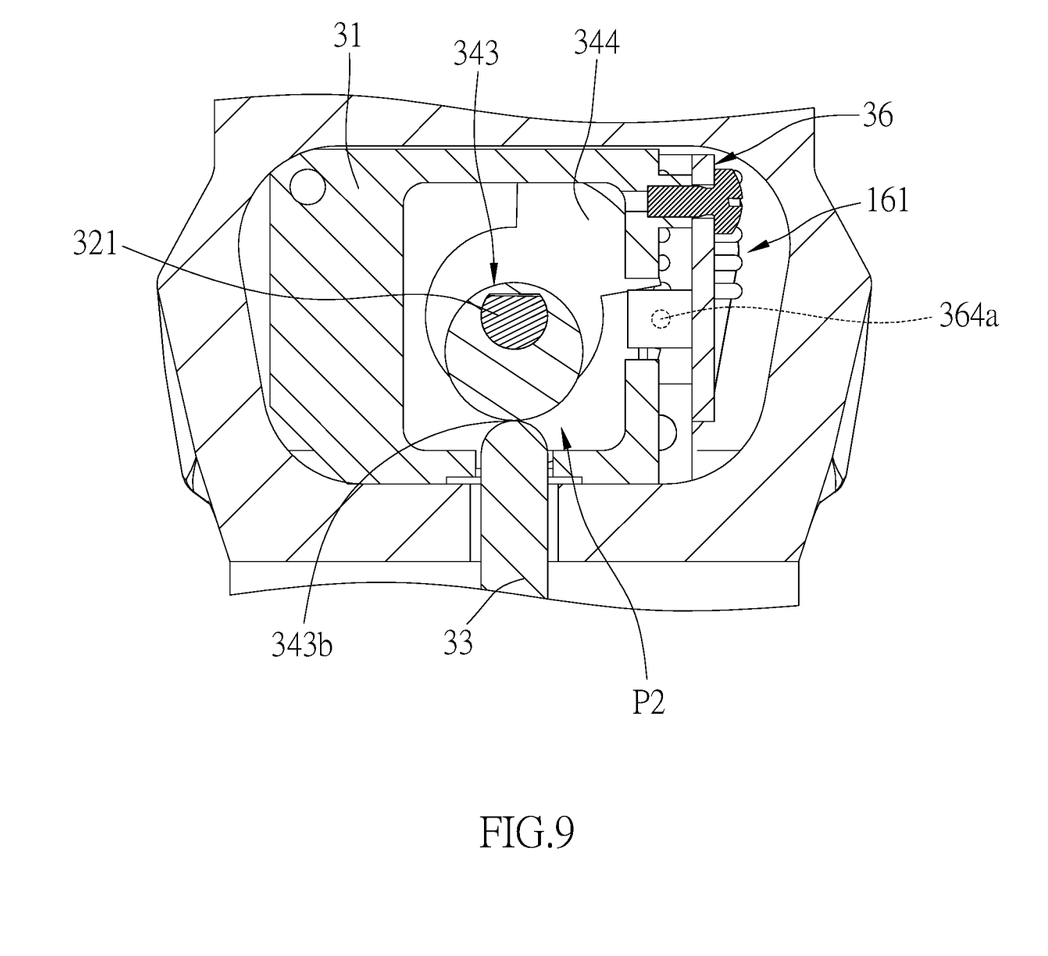
FIG. 9 is a partial sectional view similar to FIG. 7, showing that the second part of the driving part of the cam abuts against the actuation rod.
Figure 10:
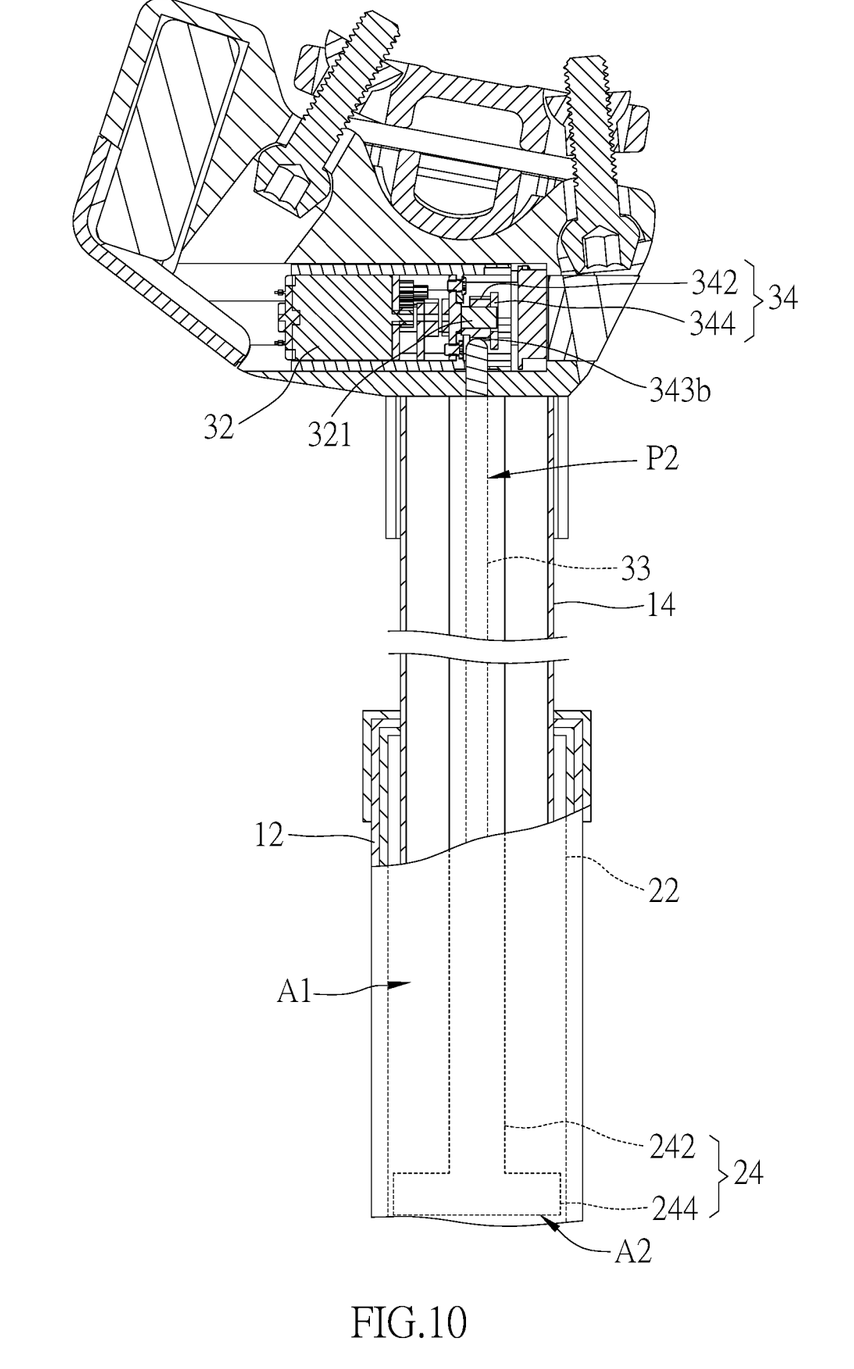
FIG. 10 is a sectional view similar to FIG. 8, showing that the inner tube moves down relative to the outer tube to shorten the length of the overall seatpost assembly.

The actuation rod 33 of the control assembly 30 is located in the piston rod 24, and an upper end of the actuation rod 33 reaches into the motor chamber 161. The cam 34 is installed on the output shaft 321, and includes a cam body 342 and a position indicator 344, which are fixedly connected to each other; the cam body 342 has a driving part 343 in a circumferential direction thereof. The driving part 343 abuts against the actuation rod 33, and drives the actuation rod 33 to reciprocate along its axis. The driving part 343 has a first part 343a and a second part 343b. As illustrated in FIG. 7 and FIG. 9, the shortest distance between the first part 343a and an axle center of the output shaft 321 is less than the shortest distance between the second part 343b and the axle center of the output shaft 321. When the first part 343a of the driving part 343 abuts against the actuation rod 33, the actuation rod 33 is in a first position P1; when the second part 343b of the driving part 343 abuts against the actuation rod 33, the actuation rod 33 is in a second position P2.

The battery 35 is installed in the battery chamber 162 through the accommodating opening 16b, and is electrically connected to the control circuit board 36 (not shown) to supply voltage.

Figure 4:
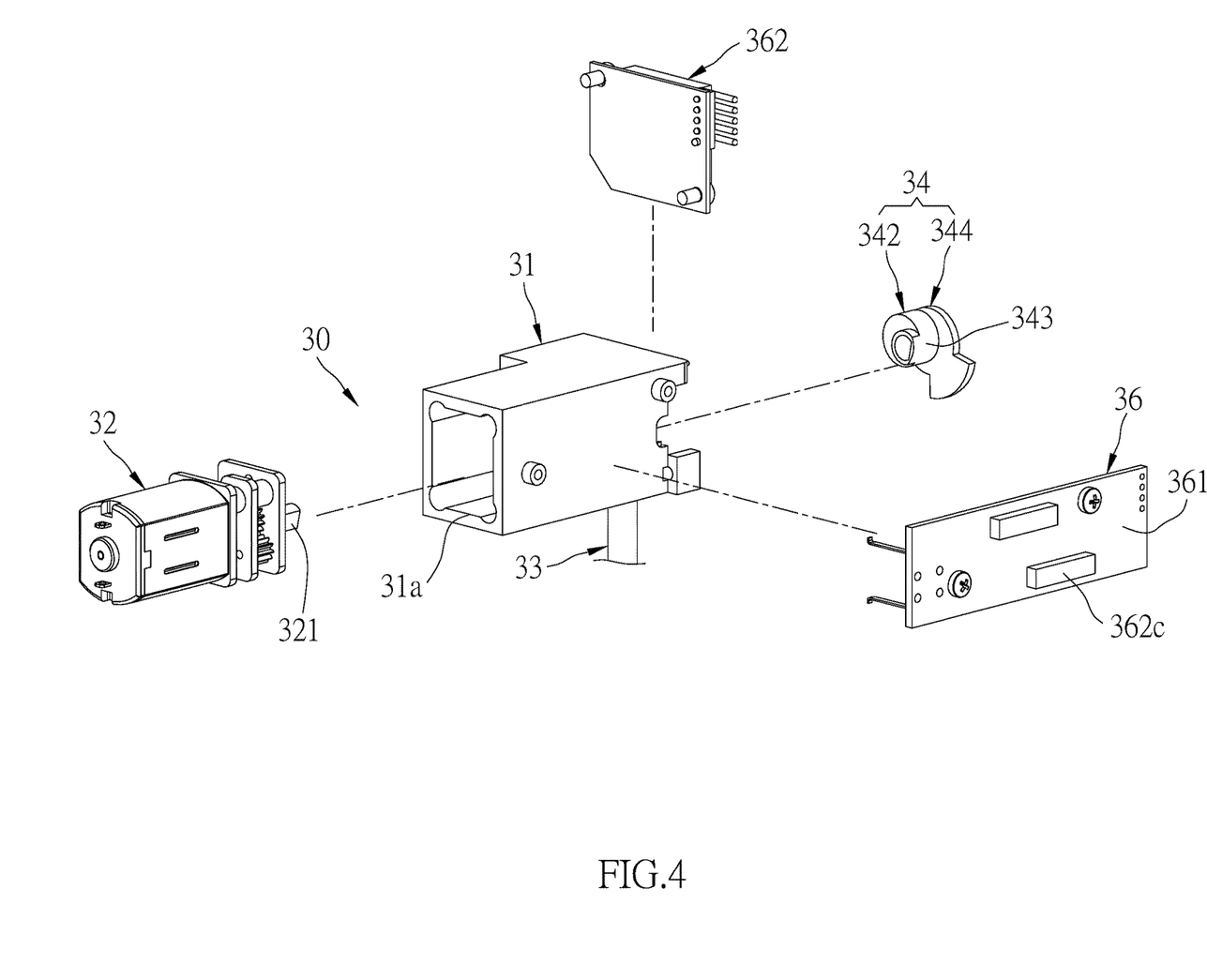
FIG. 4 is a partial exploded view of the control assembly of the bicycle adjustable seatpost of the first preferred embodiment.
Figure 5:
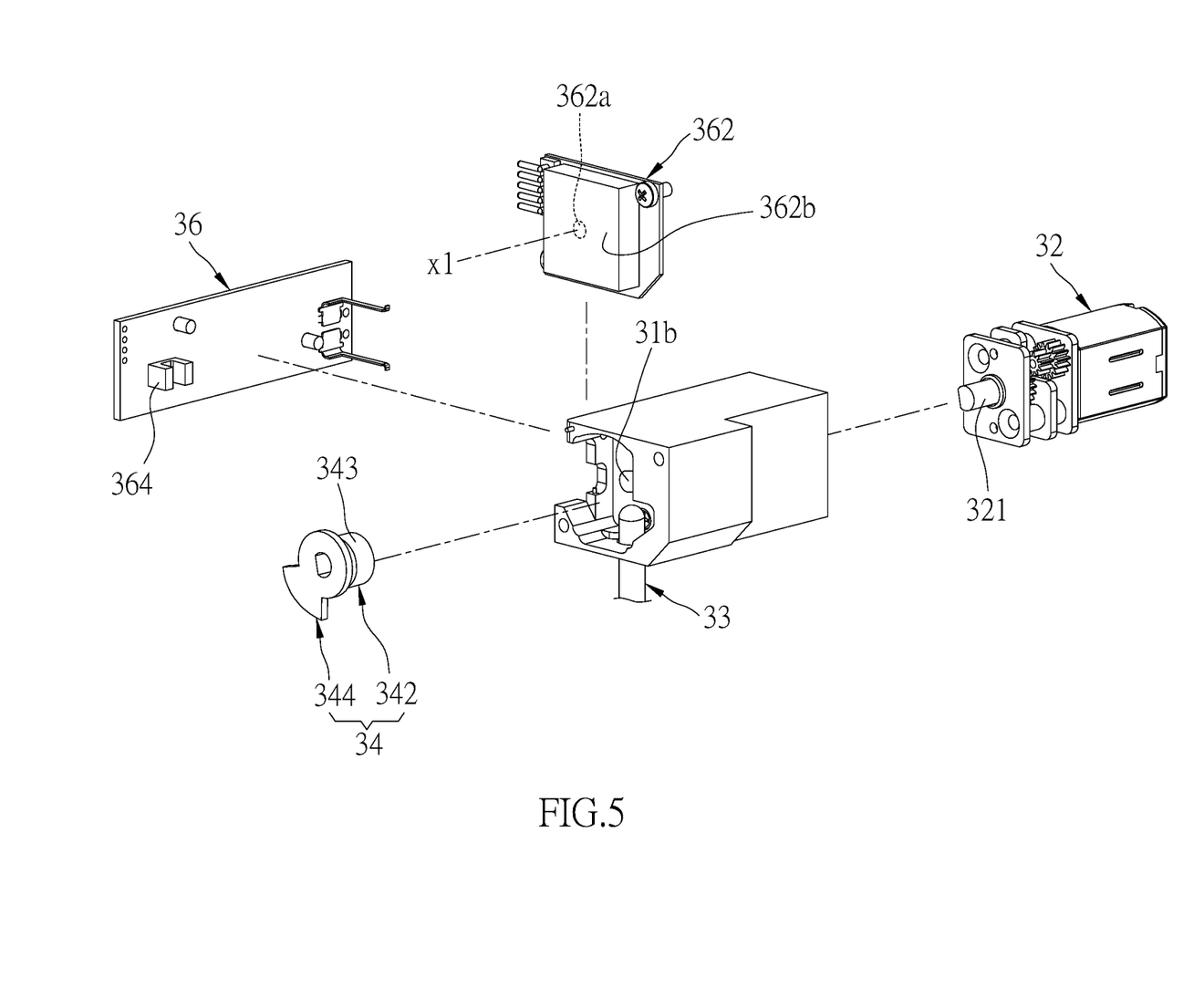
FIG. 5 is a partial exploded view of the control assembly in FIG. 4 from another aspect.
Figure 6:
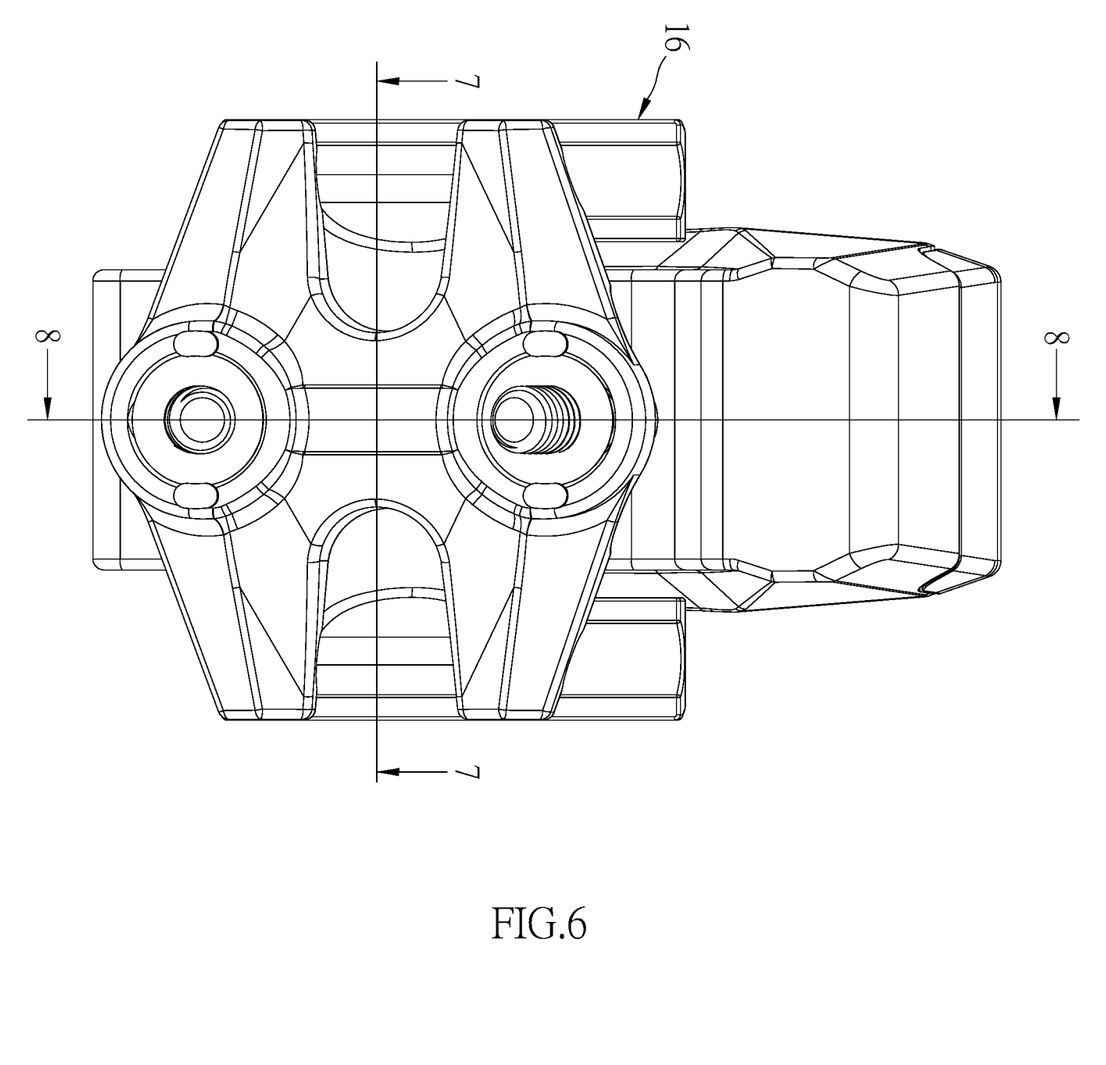
FIG. 6 is a top view of the bicycle adjustable seatpost of the first preferred embodiment.

The control circuit board 36 is installed on an outer surface of the motor housing 31, and electrically connected to the motor 32. The control circuit board 36 is provided to control the rotation of the output shaft 321 of the motor 32, and includes a wireless unit 362 and a photointerrupt sensor 364. The wireless unit 362 is provided to be connected to a signal transmitter 41 of a pressing switch 40 on the handlebar with signal, wherein the signal transmitter 41 controls the action of the motor 32 through wireless transmission. The wireless unit 362 includes an antenna 362a; a side face 362b of the wireless unit 362, which is disposed with the antenna 362a, faces the receiving opening 16a. In addition, an angle between an axis X1 perpendicular to the side face 362b and an opening direction of the receiving opening 16a is between 0° and 15°. In this embodiment, the angle between the axial direction of the antenna 362a and the opening direction of the receiving opening 16a is 0°, so that the antenna 362a has better reception. Besides, the wireless unit can be integrated with the control circuit board 36, and the antenna 362c is disposed on a side face 361 of the control circuit board 36 away from the motor 32, as shown in FIG. 4. Although the reception effect in such design is not as good as that of the previous embodiment, the configuration reduces the overall weight and occupied space.

The photointerrupt sensor 364 of the control circuit board 36 is disposed on a side face of the control circuit board 36, which is connected to the motor housing 31, and has a sensing position 364a (as shown in FIG. 7). The position indicator 344 of the cam 34 can be driven by the output shaft 321 to optionally be close to or away from the sensing position 364a. Therefore, the rotation state of the cam 34 can be detected so as to infer which part of the driving part 343 abuts against the actuation rod 33.

As depicted in FIG. 7 to FIG. 10, when a rider presses the pressing switch 40 on the handlebar, the signal transmitter 41 of the pressing switch 40 sends a signal to the wireless unit 362. Then, the control circuit board 36 reads the signal and controls the output shaft 321 of the motor 32 to rotate towards a predetermined turn R, and the position indicator 344 of the cam 34 will move toward the predetermined turn R into the sensing position 364a. Meanwhile, the driving part 343 of the cam 34 pushes the actuation rod 33 to move from the first position P1 to the second position P2. The cam 34 stops rotating when the position indicator 344 moves toward the predetermined turn R to leave the sensing position 364a, at this time, the second part 343b of the driving part 343 abuts against the actuation rod 33, wherein the actuation rod 33 is in the second position P2 so that the first chamber A1 communicates with the second chamber A2. At the same time, piston rod 24 can move up and down in the cylinder 22, which changes the volume of the first chamber A1 and the second chamber A2, so that the inner tube 14 moves along its axis relative to the outer tube 12 to achieve the purpose of adjusting the height of the saddle.

When the saddle is adjusted to an appropriate height, the rider releases the pressing switch 40, and the cam 34 moves in the opposite direction of the predetermined turn R to enter the sensing position 364a. Meanwhile, the driving part 343 of the cam 34 pushes the actuation rod 33 to move from the second position P2 to the first position P1. The cam 34 stops rotating when the position indicator 344 moves in the opposite direction of the predetermined turn R to leave the sensing position 364a, at this time, the first part 343a of the driving part 343 abuts against the actuation rod 33, wherein the actuation rod 33 is in the first position P1 so that the first chamber A1 doesn't communicate with the second chamber A2 so as to fix the saddle. In other practical applications, the mechanism of the photointerrupt sensor can be changed according to requirements. Besides, components for sensing the movement track of the cam are not limited to photointerrupt sensors, and can be electromagnetic sensor.

Furthermore, an angle between an axle center of the actuation rod 33 and the axle center of the output shaft 321 is between 80° and 100°. Preferably, the angle between the axle center of the actuation rod 33 and the axle center of the output shaft 321 is between 84° and 96°. In this embodiment, the angle between the axle center of the actuation rod 33 and the axle center of the output shaft 321 is 90°. In this way, the motor 32 can maintain better efficiency. Moreover, considering the space design of the motor chamber 161, the shortest distance between the axle center of the actuation rod 33 and the axle center of the output shaft 321 is between 0 mm and 15 mm. Therefore, said shortest distance can be slightly adjusted according to different design changes without affecting the work efficiency of the motor 32 and the amount of movement of the actuation rod 33, which does not occupy too much volume.

Figure 11:
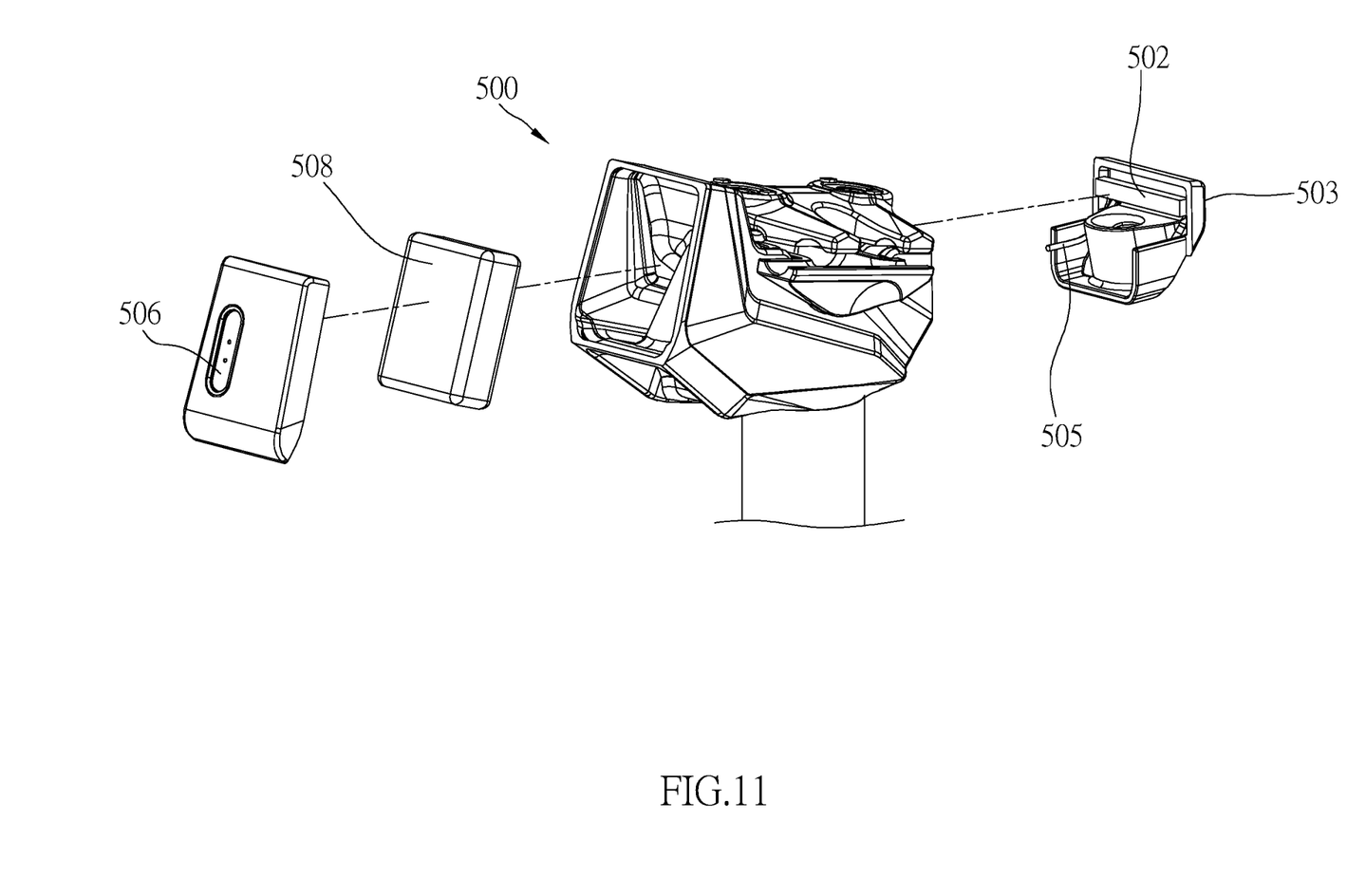
FIG. 11 is a partial exploded view of the bicycle adjustable seatpost of the second preferred embodiment.
Figure 12:
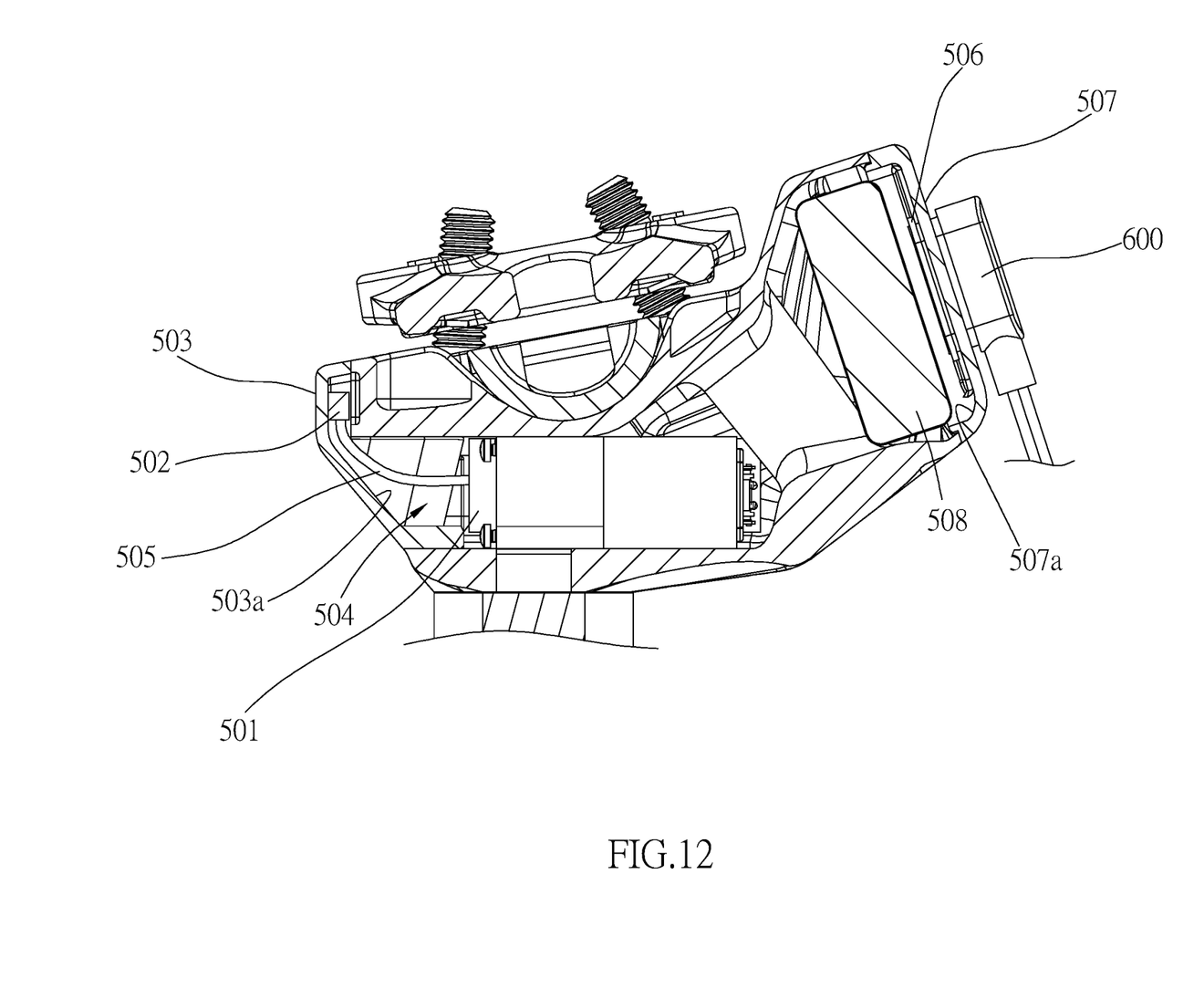
FIG. 12 is a partial sectional view of the bicycle adjustable seatpost of the second preferred embodiment.

As shown in FIG. 11 and FIG. 12, a second preferred embodiment, a bicycle adjustable seatpost 500, is provided. The wireless unit (not shown) of the bicycle adjustable seatpost 500 is integrated within the control circuit board 501; an antenna 502 which is electrically connected to the wireless unit is installed on an inside surface 503a of the first lid 503, and is located in the motor chamber 504. Furthermore, the antenna 502 is electrically connected to the control circuit board 501 through an electric wire 505. In this way, the antenna 502 has better reception. In addition, the bicycle adjustable seatpost 500 includes a charging part 506 which is installed on an inside surface 507a of the second lid 507. The charging part 506 includes a receiving coil (not shown) therein; the charging part 506 can sense an external magnetic field through the receiving coil, and convert the sensed magnetic field into an induced voltage, then transmit the induced voltage to the battery 508.

As illustrated in FIG. 12, a wireless power supply device 600 is in touch with an outside surface of the second lid 507. The wireless power supply device 600 includes a transmission induction coil (not shown) which will generate a specific magnetic field that makes the receiving coil of the charging part 506 magnetized, and thus the magnetic energy is converted into electrical energy that is transmitted to the battery 508 for charging. Moreover, the wireless power supply device 600 includes a magnet or a magnetic element made of magnetically attractable materials, and the charging part 506 also includes a magnet or a magnetic element made of magnetically attractable materials; said magnetically attractable materials include but are not limited to nickel and cobalt. The magnet or the magnetic element of the wireless power supply device 600 is magnetically attracted to the magnet or the magnetic element of the charging part 506, so that the wireless power supply device 600 can be firmly attached to the charging part 506. However, in other practical applications, the charging part can be electrically connected to a power supply device in the form of male and female connection. For example, the plug of the power supply device is inserted into the socket of the charging part to perform electrical connection with metal contacts.

From the above, in the bicycle adjustable seatpost of the present disclosure, the motor drives the cam to rotate and thus drives the actuation rod to move along its axis, so as to block or connect the first chamber and the second chamber in the cylinder, and thus to adjust or fix the length of the seatpost assembly. In addition, the design of both the angle and the distance between the axle center of the output shaft of the motor and the axle center of the actuation rod conserve the output power of the motor, and also avoid excessive volume of the connecting base. Furthermore, with the structural design between the cam and the actuation rod, when the second part of the driving part abuts against the actuation rod, the fluid passage between the first chamber and the second chamber is appropriate, which facilitates the mutual flow of the fluid between the first chamber and the second chamber, so that the process of adjusting the length of the seatpost assembly is much smoother.

It must be noted that the embodiments described above are only preferred embodiments of the present disclosure. All equivalent structures which employ the concepts disclosed in this specification and the appended claims should fall within the scope of the present disclosure.

What is claimed is:
1. A bicycle adjustable seatpost, comprising:
a seatpost assembly which comprises an outer tube and an inner tube whose outer diameter is smaller than an inner diameter of the outer tube, wherein the inner tube is at least partially disposed in the outer tube and is movable along an axial direction of the outer tube; the outer tube is provided to be installed in a frame of a bicycle;

a connecting base which is provided at an end of the inner tube to be connected to a saddle of the bicycle, wherein the connecting base has a motor chamber and a battery chamber; the motor chamber communicates with the interior of the inner tube;

a telescopic cylinder which comprises a cylinder and a piston rod, wherein the cylinder is connected to the outer tube and is filled with a fluid; the piston rod comprises a rod and a piston head connected to the rod; the rod is connected to the inner tube, wherein one end of the rod extends into the cylinder and is connected to the piston head; the piston head divides the cylinder into a first chamber and a second chamber; and a control assembly which comprises a motor, an actuation rod, a cam, a control circuit board, and a battery; the motor is provided in the motor chamber, and comprises an output shaft; the actuation rod is provided in the seatpost assembly, and one end of the actuation rod extends into the motor chamber; the cam is provided on the output shaft, and has a driving part in a circumferential direction thereof; the driving part abuts against the actuation rod, and drives the actuation rod reciprocate along an axis of the actuation rod between a first position and a second position; the driving part has a first part and a second part, wherein the shortest distance between the first part and the output shaft is less than the shortest distance between the second part and the output shaft; when the first part of the driving part abuts against the actuation rod, the actuation rod is in the first position so that the first chamber doesn't communicate with the second chamber; when the second part of the driving part abuts against the actuation rod, the actuation rod is in the second position so that the first chamber communicates with the second chamber; the control circuit board is electrically connected to the motor to control the output shaft to rotate; the battery is provided in the battery chamber, and is electrically connected to the control circuit board.

2. The bicycle adjustable seatpost of claim 1, wherein an angle between an axle center of the actuation rod and an axle center of the output shaft is between 80° and 100°.

3. The bicycle adjustable seatpost of claim 2, wherein the angle between the axle center of the actuation rod and the axle center of the output shaft is between 84° and 96°.

4. The bicycle adjustable seatpost of claim 1, wherein the shortest distance between the axle center of the actuation rod and the axle center of the output shaft is between 0 mm and 15 mm.

5. The bicycle adjustable seatpost of claim 1, wherein the motor chamber has a receiving opening, and the connecting base comprises a first lid, and the control circuit board comprises a wireless unit; the wireless unit comprises an antenna, and a side face thereof which is disposed with the antenna faces the receiving opening; an angle between an axis perpendicular to the side face and an opening direction of the receiving opening is between 0° and 15°; the first lid covers the receiving opening.

6. The bicycle adjustable seatpost of claim 5, wherein the motor chamber communicates with the battery chamber; an accommodating opening is located at a junction of the motor chamber and the battery chamber; the motor chamber is located between the saddle and the inner tube, and partly overlaps with a projection area of the inner tube extending toward the saddle; the connecting base comprises a second lid which covers the accommodating opening.

7. The bicycle adjustable seatpost of claim 6, wherein the connecting base is made of metal materials; the first lid and the second lid are made of non-metallic materials.

8. The bicycle adjustable seatpost of claim 1, wherein the control circuit board comprises a sensor which has a sensing position; a part of the cam can be driven by the output shaft to optionally be close to or away from the sensing position, and thus a rotation state of the cam can be detected.

9. The bicycle adjustable seatpost of claim 6, wherein the connecting base has at least one through hole; the at least one through hole communicates with the motor chamber, and is corresponding to one of the receiving opening and the accommodating opening; the connecting base comprises an adjusting seat and at least one fixing member which is provided in the at least one through hole, the adjusting seat, and the saddle.

10. The bicycle adjustable seatpost of claim 1, wherein the motor chamber has a receiving opening; the connecting base comprises a first lid, and the control circuit board comprises a wireless unit; the wireless unit comprises an antenna which is provided on a side face of the control circuit board away from the motor; the first lid covers the receiving opening.

11. The bicycle adjustable seatpost of claim 1, wherein the motor chamber has a receiving opening; the connecting base comprises a first lid, which covers the receiving opening; the control circuit board comprises a wireless unit which is provided to be electrically connected to an antenna; the antenna is provided on an inside surface of the first lid, and is located in the motor chamber.

12. The bicycle adjustable seatpost of claim 6, wherein the second lid comprises a charging part for charging the battery.

\* \* \* \* \*